United States Patent
Pethe et al.

(10) Patent No.: US 10,180,927 B2
(45) Date of Patent: Jan. 15, 2019

(54) DEVICE, SYSTEM AND METHOD FOR COMMUNICATION WITH HETEROGENEOUS PHYSICAL LAYERS

(71) Applicant: Intel Corporation, Santa Clara, CA (US)

(72) Inventors: Akshay G. Pethe, Hillsboro, OR (US); Mahesh Wagh, Portland, OR (US); Manjari Kulkarni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 15/158,265

(22) Filed: May 18, 2016

(65) Prior Publication Data

US 2016/0267048 A1    Sep. 15, 2016

Related U.S. Application Data

(63) Continuation of application No. 13/844,280, filed on Mar. 15, 2013, now Pat. No. 9,396,152.

(51) Int. Cl.
*G06F 13/40* (2006.01)
*G06F 13/42* (2006.01)

(52) U.S. Cl.
CPC ...... *G06F 13/4282* (2013.01); *G06F 13/4027* (2013.01); *Y02D 10/14* (2018.01); *Y02D 10/151* (2018.01)

(58) Field of Classification Search
CPC ............ G06F 13/4027; G06F 13/4282; G06F 13/385; Y02B 60/1228; Y02B 60/1235
See application file for complete search history.

(56) References Cited

U.S. PATENT DOCUMENTS

| | | | |
|---|---|---|---|
| 8,437,343 B1 | 5/2013 | Wagh et al. | |
| 8,446,903 B1 | 5/2013 | Ranganathan et al. | |
| 8,522,104 B2* | 8/2013 | Martin ................. | G06F 13/385 |
| | | | 375/228 |
| 8,549,205 B1 | 10/2013 | Harriman et al. | |
| 8,745,296 B2 | 6/2014 | Guok et al. | |

(Continued)

OTHER PUBLICATIONS

International Preliminary Report on Patentability for International Application No. PCT/US2014/018438 dated Sep. 24, 2015, 7 pgs.

(Continued)

*Primary Examiner* — Brian T Misiura
(74) *Attorney, Agent, or Firm* — Compass IP Law PC

(57) ABSTRACT

A device to process data packets for communication across PHY layers which are of different respective communication protocols. In an embodiment, the device includes a first protocol stack and a second protocol stack which are each for a PCIe™ communication protocol. The first protocol stack and a second protocol stack may interface, respectively, with a first physical (PHY) layer and a second PHY layer of the device. The first protocol stack and the second protocol stack may exchange packets to facilitate communications via both the first PHY layer and the second PHY layer. In another embodiment, the first PHY layer is for communication according to the PCIe™ communication protocol and the second PHY layer is for communication according to another, comparatively low power communication protocol.

10 Claims, 9 Drawing Sheets

(56) References Cited

U.S. PATENT DOCUMENTS

| | | |
|---|---|---|
| 9,081,907 B2 | 7/2015 | Hershko et al. |
| 9,405,718 B2 | 8/2016 | Ranganathan et al. |
| 2010/0122011 A1 | 5/2010 | Arimilli et al. |
| 2010/0122107 A1 | 5/2010 | Arimilli et al. |
| 2011/0133772 A1 | 6/2011 | Shau |
| 2012/0026342 A1 | 2/2012 | Yu et al. |
| 2012/0239839 A1 | 9/2012 | Shoemaker et al. |
| 2014/0289434 A1 | 9/2014 | Ranganathan et al. |

OTHER PUBLICATIONS

International Search Report and Written Opinion of the International Search Authority for International Application No. PCT/US2014/018438, dated Jun. 20, 2014, 10 pages.

First Office Action for U.S. Appl. No. 13/844,280 dated Oct. 7, 2015, 8 pages.

* cited by examiner

DEVICE, SYSTEM AND METHOD FOR COMMUNICATION WITH HETEROGENEOUS PHYSICAL LAYERS

PRIORITY

The present patent application is a continuation of and claims the benefit of U.S. patent application Ser. No. 13/844,280, titled, "Device, System and Method for Communications with Heterogeneous Physical Layers" filed on Mar. 15, 2013, which is incorporated by reference in its entirety.

BACKGROUND

1. Technical Field

Embodiments discussed herein generally relate to processing of data packets.

2. Background Art

To provide communication between different devices within a system, some type of interconnect mechanism is used. A wide variety of such interconnects are possible depending on a system implementation. Oftentimes to enable two devices to communicate with each other, they share a common communication protocol.

One typical type of communication protocol for communications between devices in a computer system is a Peripheral Component Interconnect Express (PCI Express™ or PCIe™) protocol. PCIe is a serialized I/O interconnect standard developed to meet the increasing bandwidth needs of the next generation of computer systems. The PCI Special Interest Group (PCI-SIG) manages a number of PCI specifications—including the PCI Express Base Specification, Revision 1.0a, Apr. 15, 2003, PCI Express Base Specification, Revision 2.0, Jan. 15, 2007, and PCI Express Base Specification, Revision 3.0, Nov. 18, 2010—as open industry standards, and provides the specifications to its members.

PCIe is one example of a load/store input/output (IO) interconnect system. The communication between the devices is typically performed serially according to this protocol at very high speeds. Various parameters regarding this protocol were developed with the intent to achieve maximum performance without regard to power efficiency, as the PCIe™ communication protocol was developed in the context of desktop computers. As a result, many of its features do not scale down to lower power solutions that could be incorporated into mobile systems.

Various other communication protocols are designed for devices to exchange information using lower power levels than those required for communications according to PCIe. As successive generations of computing and networking technologies become increasingly sensitive to incremental improvements in power efficiency, there is an increasing demand to integrate low-power solutions for communication within and/or between devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
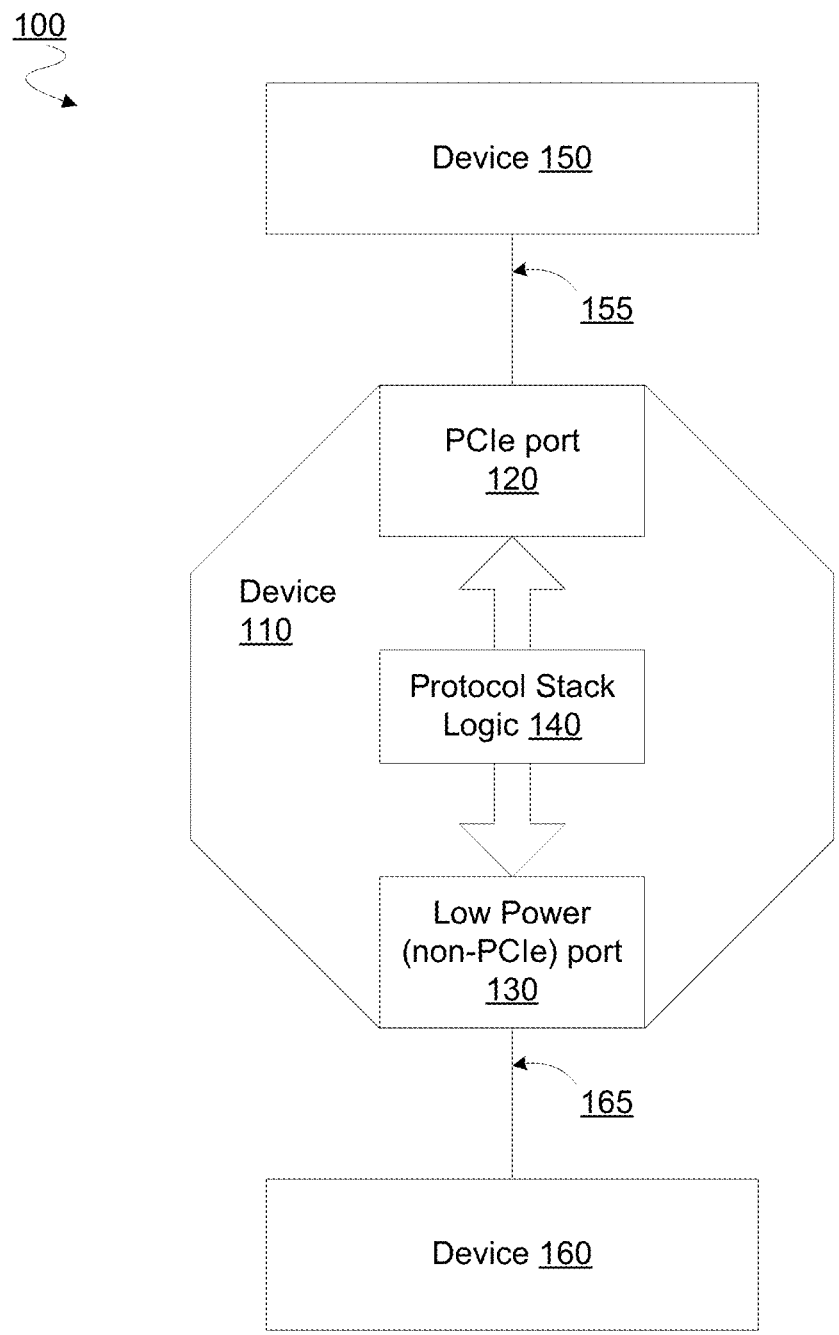
FIG. 1 is a block diagram illustrating elements of a system for exchanging data packets according to an embodiment.

Embodiments discussed herein variously provide an input/output (TO) interconnect architecture for networking between a device or devices which support PCIe functionality and one or more comparatively low power devices such as any of a variety of mobile devices including cellular telephones (such as smartphones), tablet computers, electronic readers, Ultrabooks™, and so forth.

In various embodiments, a switch, bridge or other device includes protocol stacks each for a particular communication protocol. The device may further include physical units each to interface with a different respective one of the protocol stacks. A physical unit may include both a logical layer and a physical or electrical layer that provides for the actual, physical communication of information signals over an interconnect. Such an interconnect may include, for example, a link that networks two devices or, alternatively, links two independent semiconductor die components, which may be two semiconductor die within a single integrated circuit (IC) package or separate packages, coupled, e.g., via a circuit board routing, trace or so forth. Alternatively or in addition, a physical unit may perform one or more of framing/deframing of data packets, link training and initialization, and processing of data packets for delivery onto/receipt from a physical interconnect. In an embodiment, one of the physical units may be for the same communication protocol as the protocol stacks, where another of the physical units may be for a different communication protocol Although different implementations are possible, in one embodiment a plurality of protocol stacks are each of a conventional personal computer (PC)-based communication protocol such as a PCIe™ communication protocol in accordance with the PCI Express™ Specification Base Specification version 3.0 (published Nov. 18, 2010), a further version that applies protocol extensions, or another such protocol, while at least one other of the physical units is not according to a PCIe™ communication protocol. This other physical unit may be specially designed for purposes of enabling low power operation to allow incorporation of a substantially unchanged PCIe™ upper protocol stack with this low power physical circuitry. In this way the broad legacy base of the PCIe™ communication protocol may be leveraged for communication with portable and other non-PC-based form factor devices that operate at low power.

Although the scope of the present invention is not limited in this regard, in one embodiment this at least one other physical unit may be a physical unit adapted from a mobile platform such as a so-called mobile-designed PHY ("M-PHY") according to the M-PHY Specification Version 1.00.00—8 Feb. 2011 (MIPI Board Approved 28 Apr. 2011) of the Mobile Industry Processor Interface (MIPI) Alliance (hereafter MIPI specification), which is a group that sets standards for mobile computing devices. However, other low power physical units such as according to other low power specifications such as used to couple together individual dies within a multi-chip package, or a custom low power solution may be used. As used herein, the term "low power" means at a power consumption level below a conventional PC system, and which may be applicable to a wide variety of mobile and portable devices. As an example, "low power" may be a physical unit that consumes less power than a conventional PCIe™ physical unit. As such, embodiments may variously provide for a network device—e.g. a bridge, switch and/or the like—to include PHYs for different communication protocols (also referred to herein as "heterogeneous PHYs"), where operation of each such PHY is software compatible with ubiquitous PCIe™ architectures that have a large legacy base.

In various embodiments, PCIe™ transaction and data link layers may be implemented as part of a protocol stack which includes supplemental functionality to account for different link speeds and asymmetric links, for example. Alternatively or in addition, revised link training and management may be provided to include support for multi-lane communications, asymmetric link configurations, sideband consolidation, and dynamic bandwidth scalability. Embodiments may further provide support for bridging between a conventional PCIe™-based PHY and non-PCIe™-based logic and circuitry such as M-PHY logic and circuitry. This layering approach enables a device to include a software stack (e.g., operating system (OS), virtual machine manager and/or driver which operates seamlessly via respective PCIe protocol stacks with different physical layers of that same device.

FIG. 1 shows a system 100 which, for example, includes a device 110 for communicating packetized data according to an embodiment. Device 110 may variously exchange data packets with one or more devices—e.g. including an illustrative device 150 and device 160. In an embodiment, device 110, 150, 160 are each different respective hardware platforms operating as nodes of a computer network. In another embodiment, device 110 and one or both of devices 110 are components of a single computer platform.

By way of illustration and not limitation, device 110 may include a PCIe port 120 to couple device 110 directly or indirectly to device 150 for communications via a physical link 155 which are according to a PCIe communication protocol. Alternatively or in addition, device 110 may include a low power port 130 to couple device 110 directly or indirectly to device 160 for communications via physical link 165 which are according to another communication protocol. Device 110 may include any of a variety of additional or alternative ports and/or may couple to any of one or more additional or alternative network devices, according to different embodiments. For example, devices 150, 160 may be same device, in an alternate embodiment.

Device 110 may provide functionality any of a wide variety of traditional and non-traditional computing systems, servers, network switches, network routers, wireless communication subscriber units, wireless communication telephony infrastructure elements, personal digital assistants, set-top boxes, or any other electric appliance that would benefit from an interconnection architecture, communications protocol or related methods described herein for providing packet communication via heterogeneous PHY units. Alternatively, system 100 may be such an electrical appliance—e.g. where device 110 is a component thereof for providing packet communication functionality of the electrical appliance according to an embodiment.

In an embodiment, device 110 may include protocol stack logic 140 to process a first packet received via one of ports 120, 130—e.g. where, as a result of such processing, the other of ports 120, 130 transmits a second packet which corresponds to, represents, or is otherwise based on the received first packet. Protocol stack logic 140 may include different respective hardware (not shown) for multiple PCIe protocol stacks. Such PCIe protocol stacks may each include a respective data link layer and a respective transaction layer, for example. In an embodiment, a first PHY and a second PHY (not shown) of device 110 may include or couple to PCIe port 120 and low power port 130, respectively. The first PHY and second PHY may interface, respectively, with a first PCIe protocol stack and a second PCIe protocol stack of protocol stack logic 140. As discussed herein, protocol stack logic 140 may include circuit logic for a packet to be exchanged between different protocol stacks of protocol stack logic 140. Such an exchange may facilitate operation of device 110 as a bridge, switch or other packet processing device—e.g. as a network device.

Figure 2:
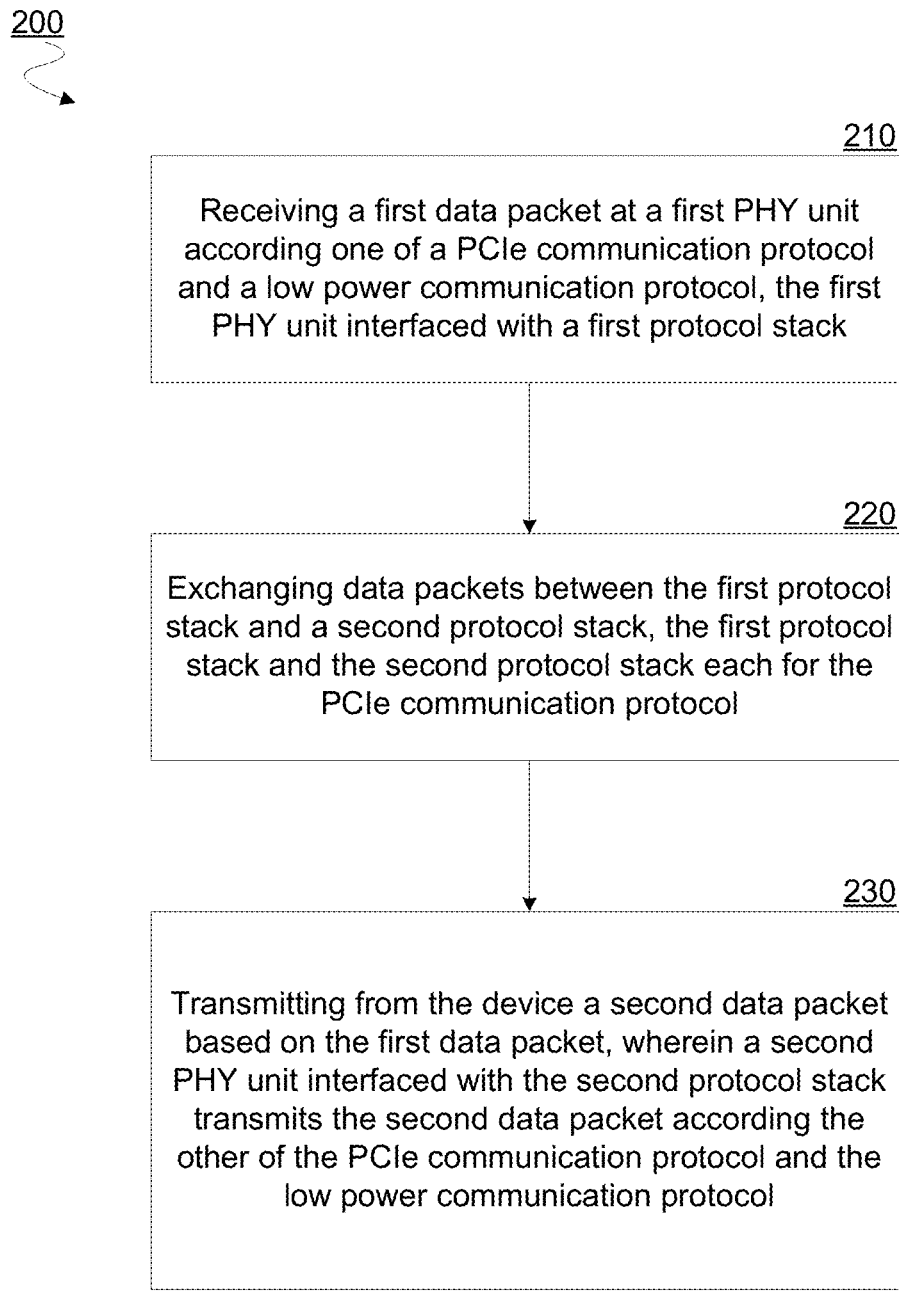
FIG. 2 is a flow diagram illustrating elements of a method for processing data packets according to an embodiment.

FIG. 2 illustrates elements of a method 200 for communicating data packets according to an embodiment. Method 200 may be performed at a device having some or all of the features of device 100. For example, method 200 may provide communication of a packet from one of PCIe port 120 and low power port 130, where the packet is based on another packet received by the other of PCIe port 120 and low power port 130.

Method 200 may include, at 210, receiving at a first physical (PHY) unit of the device a first data packet sent to the device via a first physical link. The first PHY unit may be interfaced with a first protocol stack of the device. In an embodiment, the first PHY unit receives the first data packet according one of a PCIe™ communication protocol and a low power communication protocol. The first protocol stack may operate at least in part to implement the PCIe™ communication protocol—e.g. regardless of whether the first PHY unit is for the PCIe™ communication protocol or the low power communication protocol.

In an embodiment, method 200 further comprises, at 220 exchanging data packets between the first protocol stack and a second protocol stack of the device, where the first protocol stack and the second protocol stack are each for the PCIe™ communication protocol. In an embodiment, the exchanging of data packets at 220 includes exchanging a packet based on the first data packet received at 210. For example, where the first data packet is received at 210 according to the low power communication protocol, the first protocol stack may provide to the second protocol stack a modified version of the first data packet. Such a version of the first data packet may be modified, in an embodiment, to conform to one or more requirements of the PCIe™ communication protocol.

Method 200 may further comprise, at 230, transmitting a second data packet from the device via a second physical link, the second data packet based on the first data packet. In an embodiment, a second PHY unit of the device, which is interfaced with the second protocol stack, transmits the second data packet according the other of the PCIe™ communication protocol and the low power communication protocol—e.g. the protocol other than that according to which the first data packet is received at 210.

Figure 3:
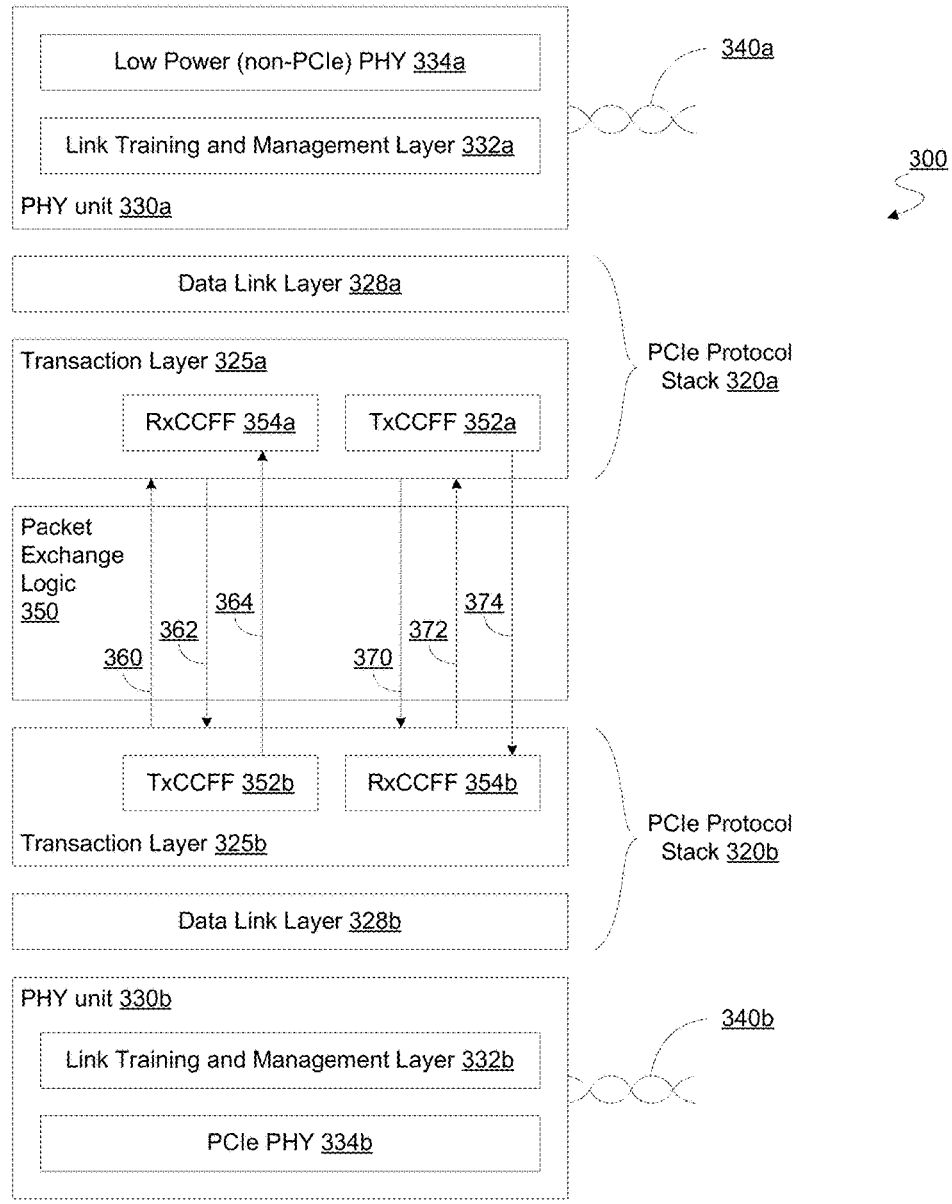
FIG. 3 is a block diagram illustrating elements of a device for processing packets according to an embodiment.

FIG. 3 illustrates elements of a device 300 for communication of data packets according to an embodiment.

Device 300 may include some or all of the features of device 110, for example. In an embodiment, device 300 is to perform some or all operations of method 200.

Device 300 may include a combination of software, firmware and/or hardware within one or more semiconductor components such as an IC to provide for handling of data communication between device 300 and another device (not shown) coupled thereto. In an embodiment, device 300 includes PHY units 330a, 330b for device 300 to communicate via links 340a, 340b, respectively. PHY unit 330a and PHY unit 330b may include, respectively, a low power PHY 334a and a PCIe PHY 334b. Communications with low power PHY 334a may, in one or more respects, require a lower amount of power than that for communications with PCIe PHY 334b. By way of illustration and not limitation, low power PHY 334a may be for communications according to a protocol other than a PCIe communication protocol, where such communications are for device 300 to exchange information with a MIN (or other) low-power device.

Device 300 may further comprise protocol stack logic which, for example, includes PCIe protocol stack 320a to interface with PHY unit 330a and PCIe protocol stack 320b to interface with PHY unit 330b. In an embodiment, the protocol stack logic further comprises packet exchange logic 350 to variously exchange data packets between multiple protocol stacks of device 300. For example, packet exchange logic 350 may exchange one or more packets between PCIe protocol stack 320a and PCIe protocol stack 320b.

In an embodiment, one or more clock crossing buffers may be included in transaction layers 352a, 352b and/or packet exchange logic 350 for variously exchanging data packets between PCIe protocol stacks 320a, 320b. By way of illustration and not limitation, transaction layer 325a may include or couple to one or more clock crossing transmit first-in-first-out (FIFO) buffers TxCCFF 352a and one or more clock crossing receive FIFO buffers RxCCFF 354a. Additionally or alternatively, transaction layer 325b may include or couple to one or more clock crossing transmit FIFO buffers TxCCFF 352b and one or more clock crossing receive FIFO buffers RxCCFF 354b.

Packet exchange logic 350 may provide signal, buffer, control and/or other logic to facilitate an exchange of data packets from TxCCFF 352a to RxCCFF 354b an exchange of data packets from TxCCFF 352b to RxCCFF 354a. For example, packet exchange logic 350 may communicate from transaction layer 325b to transaction layer 325a a status signal 360 indicating whether or not there is packetized content in TxCCFF 352b. In response to signal 360, transaction layer 325a may provide a request signal 362 for an exchange 364 of one or more packets from TxCCFF 352b. Alternatively or in addition, packet exchange logic 350 may communicate from transaction layer 325a to transaction layer 325b a status signal 370 indicating whether or not there is packetized content in TxCCFF 352a. In response to signal 370, transaction layer 325b may provide a request signal 372 for an exchange 374 of one or more packets from TxCCFF 352b.

In an embodiment, PHY unit 330b includes link manager 332b comprising logic for interfacing PHY unit 330b with PCIe protocol stack 320b. PHY unit 330b may include a PCIe PHY 334b, which may include both logical layers and physical (including electrical) sub-layers. In one embodiment, PCIe PHY 334b physically transmits a packet to an external device via interconnect 340b. As seen, portions of PCIe™ stack 320b may include a transaction layer 325b and a data link layer 328b which provide functionality for implementing PCIe communications. PCIe PHY 334b may include a transmit section to prepare outgoing information for transmission and a receiver section to identify and prepare received information before passing it to link layer 328b of PCIe protocol stack 320b.

The interfaced PHY unit 330b and PCIe protocol stack 320b may operate to variously process packets exchanged via link 340b according to a PCIe communication protocol. The processing of packets performed by PCIe protocol stack 320b and/or PHY unit 330b may be according to conventional PCIe packet processing techniques, which are outside the scope of this document. The particular mechanisms of PCIe protocol stack 320b and PHY unit 330b to implement such PCIe packet processing techniques may vary according to implementation-specific details, and may not be limiting on certain embodiments.

The processing of packets performed by PCIe™ protocol stack 320a and/or PHY unit 330a may be for communications via an interconnect 340a—e.g. a physical link coupling the device 300 with another device or component. As seen, portions of PCIe™ stack 320a may include a transaction layer 325a and a data link layer 328a which provide at least some functionality for implementing PCIe communications. For example, transaction layer 325a may operate at least in part to generate transaction layer packets (TLP), which may be request or response-based packets separated by time, allowing the link to carry other traffic while the target device gathers data for the response. The transaction layer 325a may further handle credit-based flow control, in an embodiment. Thus, transaction layer 325a may provide an interface between higher level software and/or other processing circuitry (not shown) of device 300 and an interconnect architecture including data link layer 328a and PHY unit 330a. In this regard, one responsibility of transaction layer 325a may be the assembly and disassembly of packets (i.e., transaction layer packets (TLPs)), as well as handling credit-based flow control.

In turn, data link layer 328a may sequence TLPs that are generated by transaction layer 325a and ensure reliable delivery of TLPs between two endpoints (including handling error checking) and acknowledgement processing. Thus link layer 328a may act as an intermediate stage between transaction layer 325a and PHY unit 330a, and provides a reliable mechanism for exchanging TLPs between two components by a link. One side of link layer 328a may accept TLPs assembled by transaction layer 325a, apply identifiers, calculate and apply an error detection code, e.g., cyclic recovery codes (CRC), and submit the modified TLPs to the physical layer of PHY unit 330a for transmission across link 340a to a component or other device coupled to device 300.

After processing in data link layer 328a, packets may be communicated to PHY unit 330a. In general, PHY unit 330a may include a low power PHY 334a, which may include both logical layers and physical (including electrical) sub-layers. In one embodiment, the physical layer represented by PHY unit 330a physically transmits a packet to an external device. Such a physical layer may include a transmit section to prepare outgoing information for transmission and a receiver section to identify and prepare received information before passing it to link layer 328a. The transmitter may be supplied with symbols that are serialized and transmitted to an external device. The receiver may be supplied with serialized symbols from the external device and transforms the received signals into a bitstream. The bitstream may be de-serialized and supplied to a logical sub-block.

In one embodiment, low power PHY 334a, which may be a given low power PHY either developed specially or adapted from another PHY such as an M-PHY, may provide for processing of the packetized data for communication along interconnect 340a. As further seen in FIG. 3, a link training and management layer 332a (also referred to herein as link manager) may also be present within PHY unit 330a. In various embodiments, link manager 332a may include certain logic that may be implemented from another communication protocol such as a PCIe™ protocol and specialized logic to handle interfacing between the conventional, e.g., PCIe™ protocol stack above, and the physical PHY 334a of a different protocol.

In the embodiment of FIG. 3, interconnect 340a may be implemented as differential pairs of wires that may be two pairs of unidirectional wires. In some implementations, multiple sets of differential pairs may be used to increase bandwidth. Note that according to the PCIe™ communication protocol, the number of differential pairs in each direction is required to be the same. According to various embodiments, however, different numbers of pairs may be provided in each direction, which allows more efficient and lower power operation. The overall combination of PCIe protocol stack 320a, PHY unit 330a and link 340a may be referred to as a Mobile Express PCIe™ interconnect or link. While shown at this high level in the embodiment of FIG. 3, understand the scope of the present invention is not limited in this regard. That is, understand that the view shown in FIG. 3 is simply with regard to the protocol stack from the transaction layer through the physical layer. Higher level stack logic (e.g. including software stack logic) and various other circuitry of a SoC or other semiconductor device including PCIe protocol stacks $320a$, $320b$ is not shown.

Figure 4:
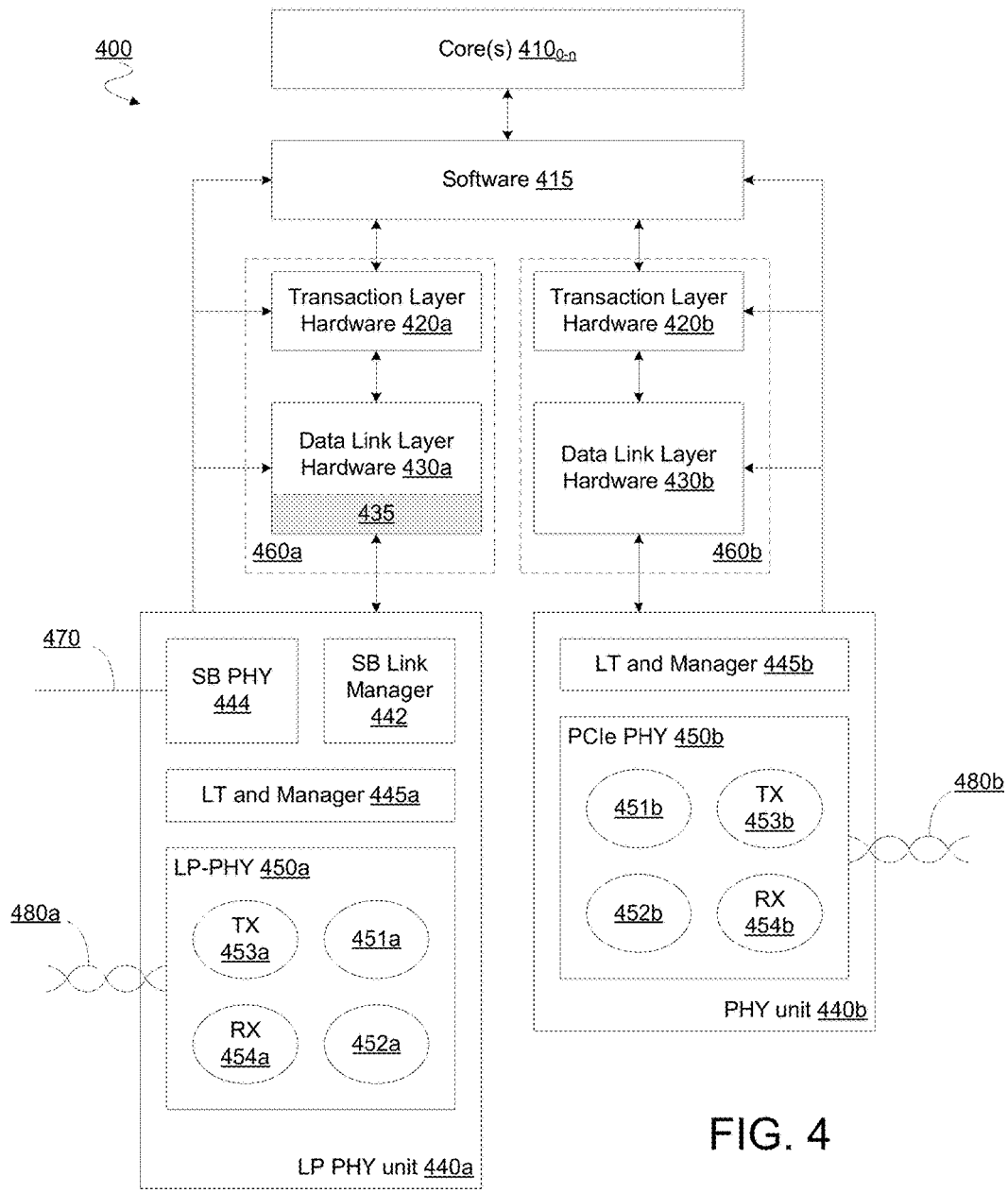
FIG. 4 is a block diagram illustrating elements of a packet processing device according to an embodiment.

FIG. 4 illustrates elements of a device 400 for communicating data packets according to an embodiment. Device 400 may include some or all of the features of device 300, for example. In an embodiment, device 400 may be or include a system-on-chip (SoC) or other circuit logic to provide computer networking functionality—e.g. where device 400 is a platform, or a component of such a platform, to be networked with one or more other remote platforms (not shown).

As seen in FIG. 4, device 400 may include one or more cores $410_0$-$410_n$. In various embodiments, one or more cores $410_0$-$410_n$ includes multiple homogeneous cores which are all of a given architecture, e.g., an in-order or out-of-order processor. Alternatively or in addition, there may be heterogeneous cores, e.g., some relatively small low power cores, e.g., of an in-order architecture, with additional cores present that may be of a larger and more complicated architecture, e.g., an out-of-order architecture. A first protocol stack 460a of device 400 may enable at least in part communication of data between different PHYs of device 400. This first protocol stack 460a may communicate with—or in another embodiment, include or share—one or more processes of software 415, which may be higher level software such as OS, firmware, and application level software that executes on one or more of the cores $410_0$-$410_n$. In an embodiment, the first protocol stack 460a includes transaction layer hardware 420a and data link layer hardware 430a. In various embodiments, transaction layer hardware 420a and data link layer hardware 430a may be of a given communication protocol such as a PCIe™ protocol. Of course, layers of different protocol stacks such as in accordance with a universal serial bus (USB) protocol stack may also be present in certain embodiments. Also, in some implementations low power PHY circuitry as described herein may be multiplexed with existing additional or alternate protocol stacks.

Still referring to FIG. 4, in turn this first protocol stack 460a may couple to a low power (LP) physical (PHY) unit 440a that may include multiple physical units that may provide for communication via multiple interconnects. For example, data link layer hardware 430a may include or couple to interface logic 435 to interface PCIe-based operations data link layer hardware 430a with MIPI-based (or other low power protocol) operations of LP PHY unit 440a. In one embodiment, a LP PHY 450a may be a low power PHY unit that in one embodiment may correspond to an M-PHY in accordance with the MIN specification to provide communication via an interconnect 480a. Although certain embodiments are not limited in this regard, LP PHY unit 440a may further include, or operate in concert with, additional hardware for device 400 to exchange sideband (SB) communications with another device.

In the embodiment shown, a SB PHY 444 of LP PHY unit 440a is to provide for communications via sideband interconnect 470, which may be a consolidated sideband to provide certain sideband information, e.g., at slower data rates than the interconnect 480a that is coupled to LP PHY 450a. In some embodiments, the various layers of the first protocol stack 460a may have a separate sideband coupling to this SB PHY 444 to enable communication along this sideband interconnect.

In addition, PHY unit 440a may further include an SB link manager 442 that may be used to control SB PHY 444. In addition, a link training and state manager 445a may be present and may be used to adapt the first protocol stack 460a, which is of a first communication protocol, to LP PHY 450a, which is of a second communication protocol, as well as providing overall control of LP PHY 450a and interconnect 480a.

As further seen, various components may be present in LP PHY 450a. By way of illustration and not limitation, transmitter and receiver circuitry (TX 453a and RX 454a, respectively) may be present. In general, this circuitry may be used to perform serialization operations, deserialization operations along with the transmission and receipt of data via interconnect 480a. A save state manager 451a may be present and may be used to save a configuration and other state information regarding LP PHY 450a—e.g. for when LP PHY 450a is in a low-power state. Alternatively or in addition, a coder 452a may be present to perform line coding, e.g., according to an 8b/10b protocol.

Note that in various embodiments, both the sideband interconnect 470 and interconnect 480a may couple between device 400 and another semiconductor component or device, e.g., another IC, such as in a multi-band radio solution. Again while the illustration of FIG. 4 is at a relatively high level, variations are possible. For example, it is possible to provide additional low power PHYs to enable higher rates of data communication, e.g., via multiple channels, where each channel is associated with an independent PHY.

In an embodiment, device 400 further comprises a second protocol stack 460b for the same PCIe communication protocol as first protocol stack 460a. Second protocol stack 460b may include transaction layer hardware 420b and data link layer hardware 430b to provide PCIe packet processing functionality corresponding to that of transaction layer hardware 420a and data link layer hardware 430a, respectively. Second protocol stack 460b may couple to a PHY unit 440b including a PCIe PHY 450b for exchanging PCIe communications via an interconnect 480b. In addition, PHY unit 440b may include a link training and state manager 445b for link training and management—e.g. according to conventional techniques for providing a PCIe link.

By way of illustration and not limitation, PCIe PHY 450b may include one or more of a save state manager 451b, a coder 452b, transmitter circuitry 453b and receiver circuitry RX 454b having functionality similar to that of save state manager 451a, a coder 452a, transmitter circuitry 453a and receiver circuitry RX 454a, respectively. For example, the respective functionality of save state manager 451b, a coder 452b, transmitter circuitry 453b and receiver circuitry RX 454b may differ from corresponding functionality of LP-PHY 450a at least insofar as such functionality is to support packet processing for a PCIe communication protocol. The processing of packets performed by second protocol stack 460b and/or PHY unit 440b may be according to conventional PCIe packet processing techniques, which are outside the scope of this document. The particular mechanisms of second protocol stack 460b and PHY unit 440b to implement such PCIe packet processing techniques may vary according to implementation-specific details, and may not be limiting on certain embodiments.

Figure 5:
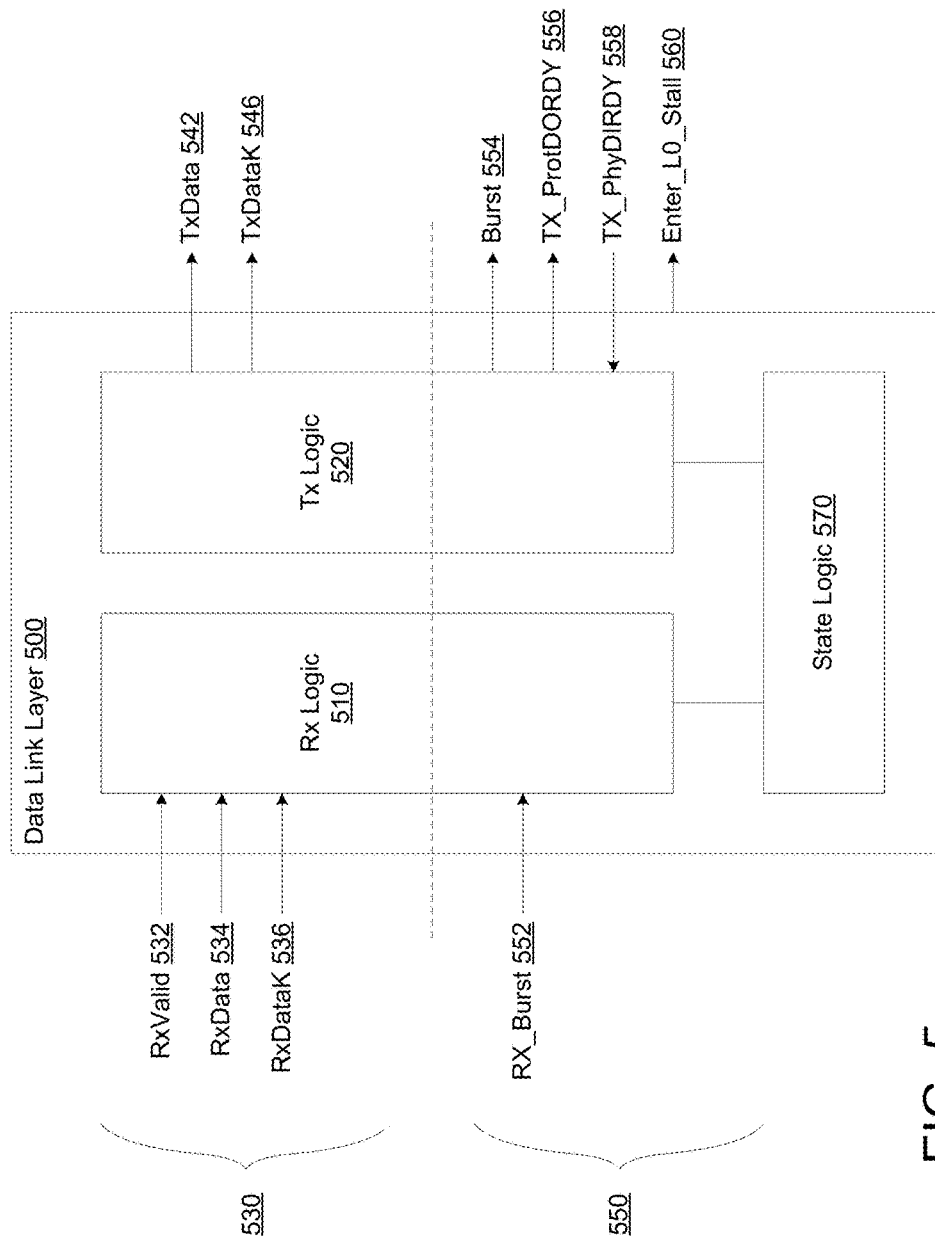
FIG. 5 is a block diagram illustrating elements of data link layer logic of a packet processing device according to an embodiment.

FIG. 5 is a high level diagram illustrating elements of a data link layer 500 for processing data packets according to an embodiment. In an embodiment, data link layer 500 is part of a protocol stack for a PCIe communication protocol, where the protocol stack is to interface with a PHY which is for communications according to a different, comparatively low power communication protocol. Data link layer 500 may include some or all of the features of data link layer hardware 430a, for example.

In an embodiment, data link layer 500 includes receiver logic 510 to receive packets from a LP PHY (not shown) which is interfaced with data link layer 500. Additionally or alternatively, data link layer 500 may include transmitter logic 520 to transmit packets to such a LP PHY. In an illustrative embodiment, the LP PHY is a MIPI M-PHY, where an interface of data link layer 500 to the LP PHY is compatible with a Reference M-PHY Module Interface (RMMI) specification such as that set forth in the Specification for M-PHY$^{SM}$, Version 2.0 of the MIPI Alliance, released Jun. 22, 2012. However, a protocol stack which includes data link layer 500 may be of a PCIe communication protocol which does not, in and of itself, support such an RMMI PHY interface. For example, the PCIe communication protocol may instead be compatible with a PHY Interface for PCI Express (PIPE) specification such as the PHY Interface for the PCI Express Architecture, PCI Express 3.0, revision 0.5, August 2008, Intel Corporation.

Certain embodiments variously avail of the fact that signals for implementing an RMMI interface may be considered a superset of signals for implementing a PIPE interface, e.g. where some, but not all, signals of the RMMI interface are functionally equivalent to respective signal lines of the PIPE interface. Accordingly, data link layer 500 may provide an interface with the LP PHY which includes first signal lines 530 of a PIPE interface and second signal lines 550 which are specific to a RMMI interface. Data link layer 500 may further comprise state logic 570 to variously determine signaling one some or all of second signal lines 550—e.g. based on signaling via first signal lines 530 and/or other information regarding state of the LP PHY.

First signal lines 530 may include some or all signal lines for meeting the requirements of a PIPE specification. By way of illustration and not limitation, first signal lines 530 may include some or all of lines RxData 534 of a Parallel PCI Express output bus, lines RxDataK 536 to indicate whether signals of RxData 534 are control signals or data signals, and RxValid 532 to indicate symbol lock and valid data on RxData 534 and RxDataK 536. Alternatively or in addition, first signal lines 530 may include some or all of lines TxData 542 of a Parallel PCI Express input bus, and lines TxDataK 546 to indicate whether signals of TxData 542 are control signals or data signals.

In addition, signal lines 550 may include some or all signal lines of a RMMI interface which, for example, are not equivalent to any signal line of the PIPE interface of signal lines 530. By way of illustration and not limitation, signal lines 550 may include RX_Burst 552 by which the LP PHY indicates to data link layer 500 the beginning and/or end of a data burst, and Burst 554 to communicate a sequence of 8b/10b encoded data transmission—e.g. delimited by and including a HEAD-OF-BURST and TAIL-OF-BURST. Alternatively or in addition, signal lines 550 may include TX_ProtDORDY 556 to indicate that data is available in a corresponding TX_Symbol bus range, and TX_PhyDIRDY 558 by which the LP PHY indicates that it is ready to accept new data on the TX_Symbol bus. In an embodiment, data link layer 500 may supplement RMMI signals to the PHY layer with an Enter_L0_Stall signal 560. Enter_L0_Stall may be used to indicate to the PHY layer that it may enter into a lower power state L0.Stall. In response to Enter_L0_Stall, the low power PHY may participate in one or more RMMI signal exchanges to implement the transition to L0.Stall.

Figure 6:
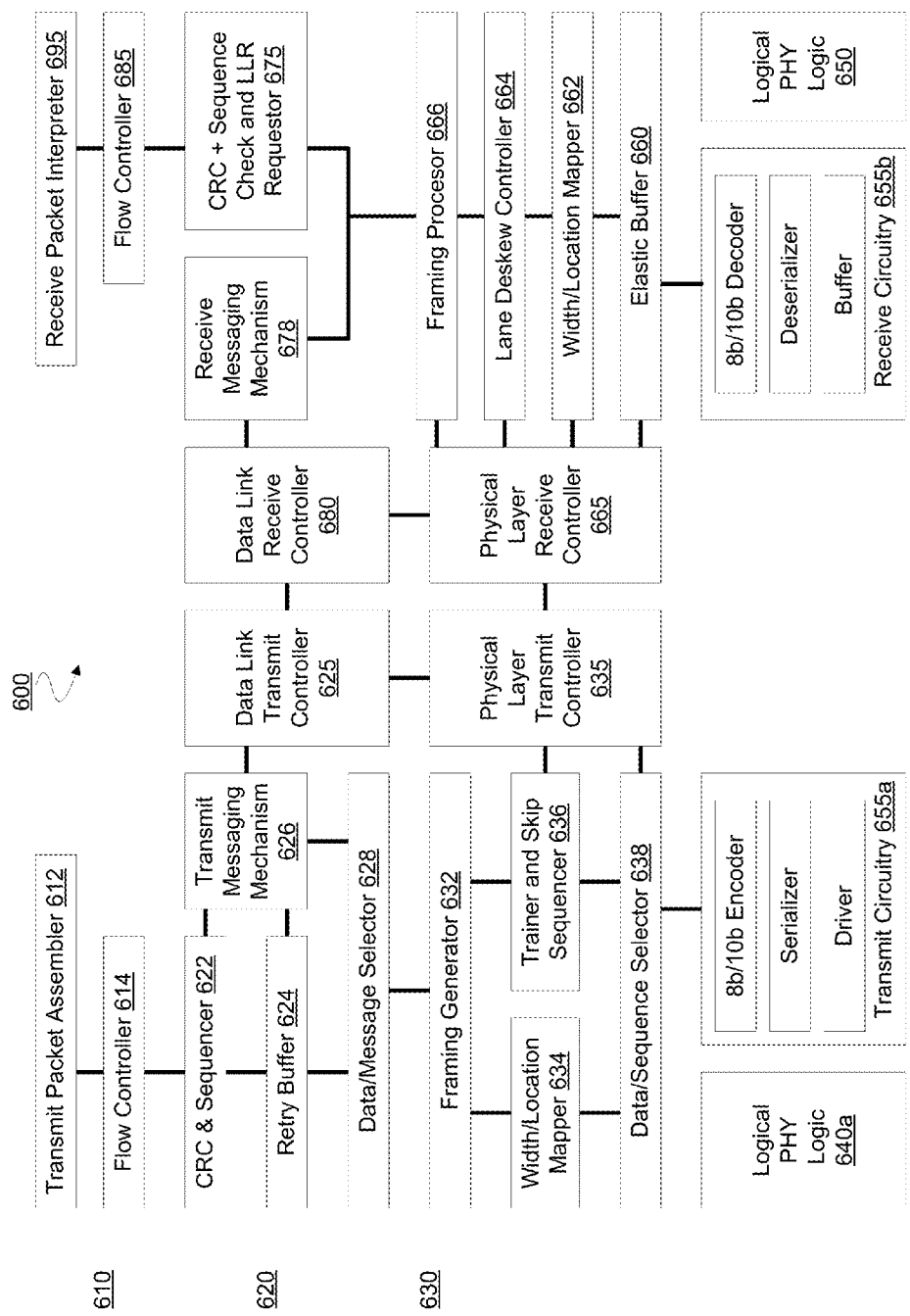
FIG. 6 is a block diagram illustrating elements of a protocol stack of a packet processing device according to an embodiment.

Referring now to FIG. 6, shown is a block diagram showing further details of a device 600 in accordance with an embodiment. As shown in FIG. 6, device 600 includes transaction layer 610 and data link layer 620 of a protocol stack, and a physical layer 630 interfaced with the protocol stack. As described herein, these different layers may be configured using either conventional transaction and data link portions of a PCIe™ protocol stack, or modified versions of such stack to accommodate interaction between these layers of this first communication protocol and a physical layer of another communication protocol, which in the embodiment of FIG. 6 may be M-PHYs according to the MIPI specification.

Device 600 may further comprise another protocol stack and interfaced PHY layer (not shown) to variously exchange data packets with transaction layer 610, data link layer 620, and physical layer 630. By way of illustration and not limitation, device 600 may further include PCIe protocol stack 320b and PHY unit 330b and, in an embodiment, packet exchange logic 350 to exchange packets with transaction layer 610.

As seen in FIG. 6 with regard to a transmit direction in which information is transmitted from device 600 via PHY layer 630, incoming information to the protocol stack, e.g., from packet exchange logic 350 other processing logic, is received in a transmit packet assembler 612 of the transaction layer, which typically combines control and data paths to form a TLP. After being assembled into transmit packets, which in various embodiment may be data packets having, e.g., 1 to 4096 bytes (or of a smaller maximum allowed size, e.g., 128 or 256), the assembled packets may be provided to a flow controller 614 which determines whether sufficient flow control credits are available based on the number required for the next TLP(s) queued for transmission and controls the injection of packets into data link layer 620. More specifically as seen, these injected packets may be provided to an error detector and sequencer 622 which in one embodiment may generate a TLP sequence number and LCRC. As further seen, data link layer 620 may further include a transmit messaging mechanism 626 that in turn generates DLLPs for link management functions and is coupled to a data link transmit controller 625 for flow control and data link integrity (ACK/NAK) mechanisms. Note that data link transmit controller 625 may be subdivided such that these functions are implemented using distinct logic blocks.

As further seen, the processed data packets may be provided to a retry buffer 624, which holds a copy of each TLP until acknowledged by the component on the other side of the link. Retry buffer 624 may in practice be implemented with buffering higher up the stack (in or above assembler 612) and buffered TLPs may be stored in corresponding entries until selected for transmission to physical layer 630 via a data/message selector 628. In general, the above-described transaction layer 610 and data link layer 620 may operate in accordance with conventional PCIe™ protocol stack circuitry, with certain modifications as described herein.

Physical layer 630 may include or couple to logic for providing interfacing to PHY circuitry which is of another communication protocol. As seen, the incoming packets may be applied to a framing generator 632, which adds physical layer framing symbols and generates framing for the packets and provides them to a width/location mapper 634 that shifts the bytes in the datapath to generate the required alignment for external transmission, adjusting datapath width if needed. Framing generator 632 may be further coupled to a trainer and skip sequencer 636 to perform link training and skip sequencing. As seen, framing generator 632, trainer/sequencer 636 and a data/sequence selector 638 all may be coupled to a physical layer transmit controller 635 which, for example, includes a transceiver portion of a Link Training Status State Machine (LTSSM) and/or related logic. Skip sequencer 636 may include logic to generate physical layer transmissions such as training sets (TS) and skip ordered sets. In this way, the framed packets may be selected and provided to physical circuitry to perform coding, serialization and driving of the serialized signals corresponding to the processed packets onto a physical interconnect. In one embodiment, the mapping of symbol differences between the different communication protocols may be performed in the framing generator 632.

In an embodiment, multiple individual channels or lanes (not shown) may be provided for this physical interconnect. In the embodiment shown, each physical channel or lane may include its own independent PHY unit transmit circuitry 655a, each of which in one embodiment may be part of an M-PHY unit in accordance with the MIPI specification. As described herein unlike PCIe™ where the number of transmitters and receivers match, different numbers of transmitters and receivers may be present. Thus as seen, each transmit circuit 655a may include an encoder which acts to encode symbols according to an 8b/10b encoding, a serializer to serialize the encoded symbols, and a driver to drive the signals onto the physical interconnect. As further seen, each lane or channel may be associated with a logical unit 640, which may be logical circuitry according to the MIPI specification for an M-PHY to thus manage the physical communication via the corresponding lane.

Still referring to FIG. 6, incoming information received via physical interconnects may similarly pass through physical layer 630, data link layer 620, and transaction layer 610 via receive mechanism of these layers. In the embodiment shown in FIG. 6, each PHY unit may further include receive circuitry, such as receive circuitry 655b, which in the embodiment shown may be present for each lane of the physical link. In another embodiment, the number of receiver circuits 655b and transmitter circuits 655a is different. As seen, this physical circuitry may include an input buffer to receive incoming information, a deserializer to deserialize the information, and a decoder which may act to decode the symbols communicated in an 8b/10b encoding. Each transmit lane or channel may be associated with a logical unit 650, which may be logical circuitry according to a given specification (such as the MIPI specification for an M-PHY) to thus manage the physical communication via the corresponding lane.

The decoded symbols in turn may be provided to a logical portion of physical layer 630, which as seen may include elastic buffers 660 where the elastic buffer accommodates differences in clocking between this component and the other component on the link. The location of elastic buffers 660 differ in various implementations, e.g., to be below the 8b/10b decoder, or to be combined with the lane deskew buffer and to store the incoming decoded symbols. In turn, the information may be provided to a width/location mapper 662, and from there to a lane deskew buffer 664 that performs deskew across multiple lanes and for multi-lane cases, buffer 664 may handle differences in signal skew between lanes to re-align bytes. In turn, the deskewed information may be provided to a framing processor 666 which may remove framing present in the incoming information. As seen, a physical layer receive controller 665 may be coupled to and control elastic buffers 660, mapper 662, deskew buffer 664, and framing processor 666.

Still referring to FIG. 6, the recovered packets may be provided to both a receive messaging mechanism 678 and an error detector, sequence checker and link level retry (LLR) requestor 675. This circuitry may perform error correction checking on the incoming packets, e.g., by way of performing CRC checksum operations, performing sequencing checks, and requesting link level retry of packets incorrectly received. Both receive messaging mechanism 678 and error detector/requestor 675 may be under control of a data link receive controller 680.

Still referring to FIG. 6, the packets thus processed in unit 675 may be provided to transaction layer 610, and more specifically to a flow controller 685, which performs flow control on these packets to provide them to a packet interpreter 695. Packet interpreter 695 may perform interpretation of the packets and forward them on to a selected destination, e.g., packet exchange logic 350. Although shown at this high level in the embodiment of FIG. 6, understand that the scope of the present invention is not limited in this regard.

Note that PHY 640a may use the same 8b/10b encoding as supported by PCIe™ for transmission. The 8b/10b encoding scheme provides special symbols that are distinct from data symbols used to represent characters. These special symbols may be used for various link management mechanisms as described in the physical layer chapter of the PCIe™ specification. Additional special symbol usages by the M-PHY are described in the MIPI M-PHY specification. Embodiments may provide for a mapping between PCIe™ and MIPI M-PHY symbols.

Referring now to Table 1, shown is an exemplary mapping of PCIe™ symbols to M-PHY symbols in accordance with one embodiment of the present invention. Thus this table shows mapping of special symbols for a converged protocol stack in accordance with one embodiment of the present invention.

TABLE 1

| Control Symbols | PCIe Encoding | Mapping of Converged Stack | MIPI M-PHY Mapping | Comment |
|---|---|---|---|---|
| K28.5 | COM | COM | | Marker0 |
| K28.3 | IDL | IDL | | Marker1 |
| K28.6 | Reserved | SDP | Marker2 | Note: Map SDP here since the original PCIe encoding maps to M-PHY reserved encoding. |
| K23.7 | PAD | SKP | Marker3 | Note: Map SKP to neutral disparity K23.7 symbol since it does not advance the scrambler/de-scrambler. |
| K27.7 | STP | STP | | Marker4 |
| K29.7 | END | END | | Marker5 |
| K30.7 | EDB | EDB | | Marker6 |
| K28.1 | FTS | PAD | Filler | Note: Map PAD here since SKP has taken its encodings. FTS is not needed since the M-PHY SYNC mechanism may be used. M-PHY SYNC mechanism is a better option since the defined SYNC symbols have higher edge density. RMMI spec requires M-PHY to insert Fillers when TX_DORDY is low. |
| K28.0 | SKP | Reserved | | Reserved |
| K28.2 | SDP | Reserved | | Reserved |
| K28.7 | EIE | Reserved | Reserved | Note: EIE is not required since M-PHY squelch is detecting DIF-Z to DIF-N transition. |
| Others | Reserved | Reserved | | Reserved |

The 8b/10b decode rules are the same as defined for PCIe™ specification. The only exception for 8b/10b rules is when detecting a TAIL OF BURST, which is a specific sequence that violates the 8b/10b rules. According to various embodiments, physical layer 630 may provide a notification to data link layer 620 of any errors encountered during the TAIL OF BURST.

In one embodiment, the framing and application of symbols to lanes may be as defined in the PCIe™ specification, while data scrambling may be the same as defined in the PCIe™ specification. Note however that the data symbols transmitted in the PREPARE phase of a communication according to the MIPI-specification are not scrambled.

With regard to link initialization and training, the link manager may provide for configuration and initialization of the link which as discussed above may include one or more channels of lanes, support of normal data transfers, support of state transitions when recovering from link errors, and port restart from a low power state. To effect such operation, certain physical and link-related features—e.g. including PHY parameters such as initial link speed and supported speed; and initial link width and supported link widths—may be known a priori, e.g., prior to initialization.

In one embodiment, training may include various operations. Such operations may include initializing the link at the configured link speed and width, bit lock per lane, symbol lock per lane, lane polarity, and lane-to-lane deskew for multi-lane links. In this way, training may discover lane polarity and perform adjustments accordingly. However, note that link training in accordance with an embodiment may not include link data rate and width negotiation, link speed and width degradation. Instead as described above upon initialization of a link, both entities a priori know the initial link width and speed and thus the time and computation expense associated with negotiation may be avoided.

PCIe™ ordered sets may be used with the following modifications: TS1 and TS2 ordered sets are used to facilitate IP re-use but many fields of the training ordered sets are ignored. Also, fast training sequences may not be used. An electrical idle ordered set (EIOS) may be retained to facilitate IP re-use, as is a Skip OS, but the frequency of Skip OS may be at a different rate than according to the PCIe™ specification. Note also that data stream ordered sets and symbols may be the same as according to the PCIe™ specification.

Some or all of the following events may be communicated to facilitate link training and management: (1) presence, which may be used to indicate that an active PHY is present on the remote end of the link; and (2) configuration ready, which is triggered to indicate that PHY parameter configuration is completed and the PHY is ready operate at configured profile. In one embodiment such information may be communicated via a consolidated sideband signal.

For purposes of control of electrical idle situations, the PHY may implement a TAIL OF BURST sequence that is used to indicate that the transmitter is entering into an electrical idle state. In one embodiment, the sideband channel may be used to signal exit from electrical idle. Note that this indication may be in addition to PHY squelch break mechanisms. An OPENS sequence of symbols may be transmitted as an EIOS to indicate entry into electrical idle state.

In some embodiments, a fast training sequence (FTS) is not defined. Instead, a PHY may use a specific physical layer sequence for exit from stall/sleep state to a burst state that may be used to address bit lock, symbol lock and lane-to-lane de-skew. A small number of FTS may be defined as a sequence of symbols for robustness. A start of data stream ordered set may be according to the PCIe™ specification, as is link error recovery.

As to link data rates, in various embodiments the initial data rate at which the link initializes may be at a predetermined data rate. A data rate change from this initial link speed may occur by going through a recovery state. Embodiments may support asymmetric link data rates where the data rate is permitted to be different in opposite directions.

In one embodiment, the link widths supported may be according to those of the PCIe™ specification. Further, as described above, embodiments may not support a protocol for negotiating link width as the link width is predetermined, and as a result link training may be simplified. Of course, embodiments may provide support for asymmetric link widths in opposite directions. At the same time, the initial link width and the initial data rate to be configured for each direction of the link may be a priori known before training starts.

With respect to physical ports of the PHY unit, the ability for a ×N port to form a ×N link as well as a ×1 link (where N may be 32, 16, 12, 8, 4, 2, and 1) is not required and the ability for a ×N port to form any link width between N and 1 is optional. An example of this behavior includes a ×16 port, which may only configure into one link, but the width of the link may be configured to be ×12, ×8, ×4, ×2 as well as required widths of ×16 and ×1. As such, designers seeking to implement devices using a protocol stack in accordance with an embodiment may connect ports between two different components in a way that allows those components to meet the above requirements. If the ports between components are connected in ways that are not consistent with intended usage as defined by the component's port descriptions/data sheets, behavior is undefined.

In addition, the ability to split a port into two or more links is not prohibited. If such support is appropriate for a given design, the port may be configured to support a specific width during training. An example of this behavior would be a ×16 port that may be able to configure two ×8 links, four ×4 links, or 16 ×1 links.

When using 8b/10b encoding, an unambiguous lane-to-lane de-skew mechanism, as in the PCIe™ specification, is the COM symbol of ordered sets received during training sequence or SKP ordered sets, since ordered sets are transmitted simultaneously on all lanes of a configured link. The MK0 symbol transmitted during the sync sequence of HS-BURST may be used for lane-lane de-skew.

As briefly described above with regard to FIG. 6, a link training and state manager may be configured to perform various operations, including adapting the upper layers of a PCIe™ protocol stack to a lower layer PHY unit of a different protocol. Furthermore, this link manager may configure and manage single or multiple lanes and may include support for a symmetric link bandwidth, compatibility of the state machine with PCIe™ transaction and data link layers, link training, optional symmetric link stall states, and control of sideband signals for robust communications. Accordingly, embodiments provide for implementing PCIe™ transaction and data link layers with limited modifications to account for different link speeds and asymmetric links. Furthermore, using a link manager in accordance with an embodiment, support for multi-lane, asymmetric link configuration, sideband consolidation and dynamic bandwidth scalability may be realized, while further enabling bridging between layers of different communication protocols.

Figure 7:
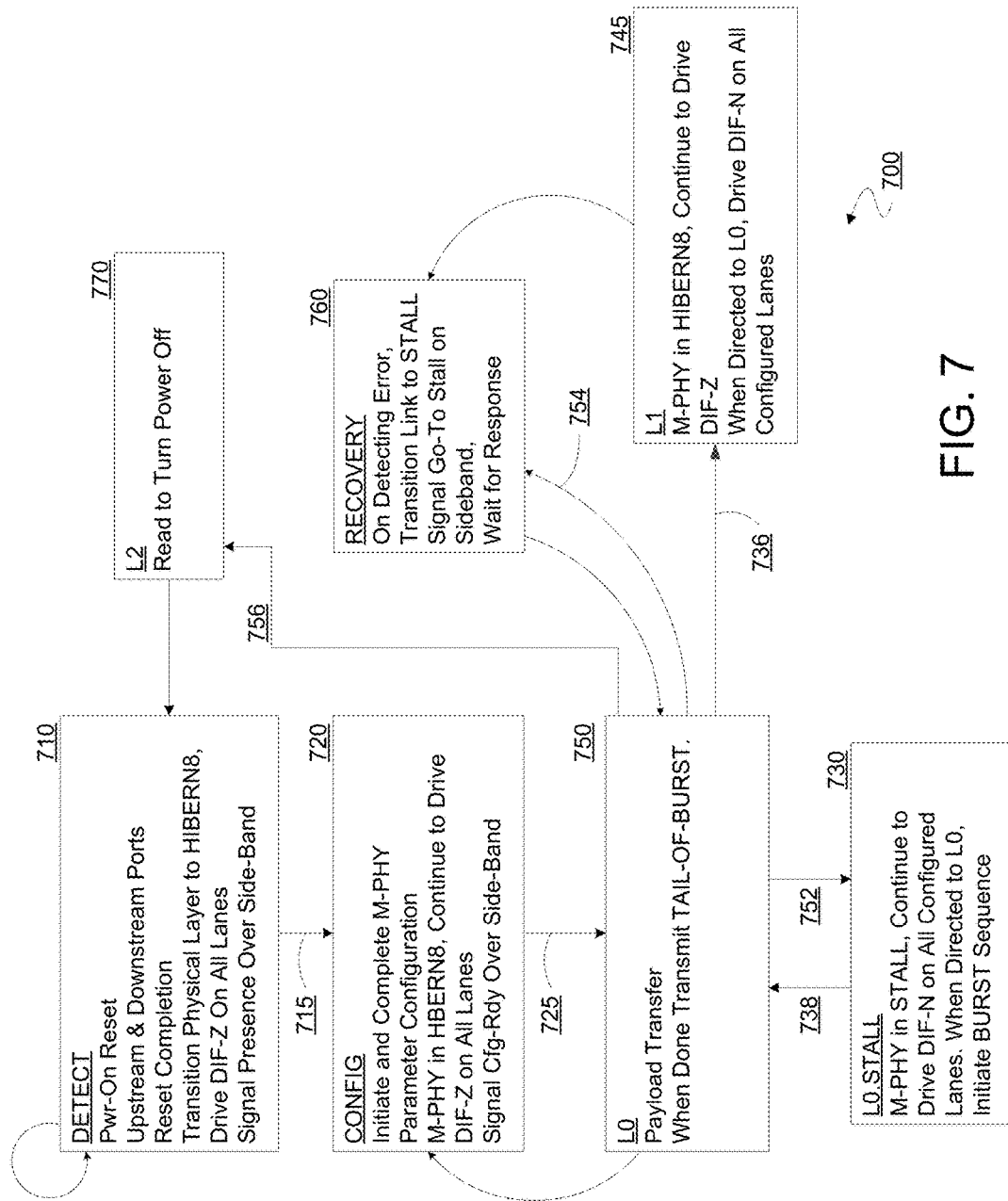
FIG. 7 is a state diagram illustrating elements of link manager logic of a packet processing device according to an embodiment.

Referring now to FIG. 7, shown is a state diagram 700 for a link training state machine, which may be part of a link manager in accordance with an embodiment. As shown in FIG. 7, link training may begin in a detection state 710. This state occurs on power on reset and is applicable both to upstream and downstream ports. After reset completion, all configured lanes may transition to a given state, namely a HIBERN8 state, upon which each end of the link may signal, e.g., via a PRESENCE signal using a sideband channel. Note that in this detection state, a high impedance signal, namely a DIF-Z signal, may be driven on all lanes.

Thus control passes from detect state 710 to configuration state 720 when the PRESENCE event 715 is signaled and received, and this high impedance is driven on all configured lanes. In configuration state 720, the PHY parameters may be configured and upon completion on all configured lanes of each end of the link, a configuration ready signal (CFG-RDY) may be indicated, e.g., using the sideband interconnect, while high impedance is maintained on all lanes.

Thus upon the sending and receiving, at 725, of this configuration ready indication via the sideband interconnect, control passes to the active state L0 (state 750). As seen, depending on whether data is available for transmission or receipt control may pass to a lower power state L0.Stall (state 730), a recovery state 760, a deeper low power state (L1 state 745), or back to configuration state 720. In stall state L0.Stall 730, the PHY transitions to a STALL state and continues to drive the high impedance on all configured lanes.

Thus in the L0.Stall state 730, a negative drive signal DIF-N may be communicated on all configured lanes. Then when directed by the initiator a BURST sequence may begin. Accordingly, control passes, at 738, to active state L0 750 after transmission of a MARKER 0 (MK0) symbol.

In one embodiment, a receiver may detect exit from the STALL state on all configured lanes and perform a bit lock and symbol lock according, e.g., to the MIPI specification. In embodiments with a multi-lane link, this MK0 symbol may be used to establish lane-to-lane deskew.

Still referring to FIG. 7, for active data transfer, control thus passes to active state 750. Specifically, this is the state where link and transaction layers begin exchanging information using data link layer packets (DLLPs) and TLPs. As such, a payload transfer may occur and at the conclusion of such transfer, a TAIL of BURST symbol may be communicated.

As seen, from this active state control may pass back to L0.Stall state 730, to a recovery state 760, e.g., responsive to a receiver error or when otherwise directed, or to a deeper low power (e.g., an L2) state 770. To return to the L0.Stall state 730 at 752, the transmitter may send an EIOS sequence followed by a TAIL of BURST indication on all configured lanes.

If an error occurs or otherwise as directed, control may also pass, at 754, to recovery state 760. Here, a transition to recovery state 760 causes all configured lanes in both directions to enter into the STALL state. To effect this, a GO TO STALL signal may be sent on the sideband interconnect and the transmitter of this signal may wait for a response. Note that this recovery state thus establishes the protocol using the sideband to coordinate simultaneous entry into the STALL state.

With regard to low power operation, control passes to the L1 lower power state 745 from the L0 state 750, at 736, so that the PHY may be placed into a HIBERN8 state. In this state, a negative drive signal, namely a DIF-Z signal may be driven on all configured lanes. When directed to exit the state, control passes back to Recovery state 760.

As also seen, the deeper low state L1 745 may be entered when conditions have been met such as, for example, completely power gating or turning off power to the PHY unit. In this deeper low power state, the PHY may be placed in the HIBERN8 state, and the high impedance signal driven on all configured lanes. To exit this state, control passes back to the STALL state, via driving of DIF-N on all configured lanes.

As further seen in FIG. 7, additional states may be present, namely a still further deeper low power state (L2) 770, which may be entered, at 756, from an active state L0 750 when power is ready to turn off. In one embodiment, this state may be the same as that of the PCIe™ specification.

Referring now to Table 2, shown is a mapping between LTSSM states according to the PCIe™ specification and corresponding M-PHY states in accordance with an embodiment of the present invention.

TABLE 2

| LTSSM State | M-PHY State | Details |
| --- | --- | --- |
| Detect, Polling | SAVE | State transitions through SAVE sub-states |
| Configuration | BURST | BURST (PREP, SYNC) sub-states |
| Recovery | BURST/ SLEEP/STALL | May be in BURST state but will transition to BURST through SLEEP/STALL |
| L0 | BURST (payload) | BURST mode and exchange transactions |
| L0s | STALL | STALL state |
| L1 | HIBERN8 | HIBERN8 state |
| L2 | UNPOWERED | UNPOWERED state |
| Disabled | DISABLED | DISABLED state |
| Loopback | No action | Link speed may change on entry to Loopback from Configuration |

As described above with regard to FIG. 4, embodiments provide for a consolidated sideband mechanism that may be used for link management, along with optional in-band support. In this way, using the sideband circuitry and interconnect, link management and control may occur independently of the higher speed (and greater power consuming) circuitry of the physical layer for the primary interconnect. Further in this way, this sideband channel may be used when the portions of the PHY unit associated with the primary interconnect are powered off, enabling reduced power consumption. Also, this consolidated sideband mechanism may be used before training of the primary interconnect, and also may be used when a failure is present on the primary interconnect.

To realize one or more sideband implementations in a given system, a semantic layer may be provided, which may be used to determine the meaning of the information to be exchanged over the physical layer, as well as a policy layer, which may be used to comprehend the device/platform level action/reactions. In one embodiment these layers may be present in a SB PHY unit.

By providing a layered approach, embodiments allow for different physical layer implementations that may include both sideband capabilities (which may be preferred in some implementations due to simplicity and/or low power operation) and in-band, which may be preferred for other implementations, e.g., avoiding the need for additional pin count.

In one embodiment, a number of sideband signals may be configured, e.g., via the semantic layer into a single packet for communication via the consolidated sideband mechanism (or an in-band mechanism). In one embodiment, Table 3 below shows the various signals that may be present in one embodiment. In the Table shown, the logical direction of the signals is shown by the arrow, where an up arrow is defined to be the direction to the host (e.g., a root complex) and the down arrow is defined to be the direction to the device (e.g., a peripheral device such as a radio solution).

TABLE 3

Device Present ↑
Power Good ↓
Power Off ↓
Refclock Good ↓
Fundamental Reset ↓
Config Ready ↑↓
Ready to Train ↑↓
Start Training ↑↓
L1pg Request ↑↓
L1pg Reject ↑↓
L1pg Grant ↑↓

TABLE 3-continued

OBFF CPU Active ↓
OBFF DMA ↓
OBFF Idle ↓
Wakeup ↑
Ack receipt of handshake ↑↓

Figure 8:
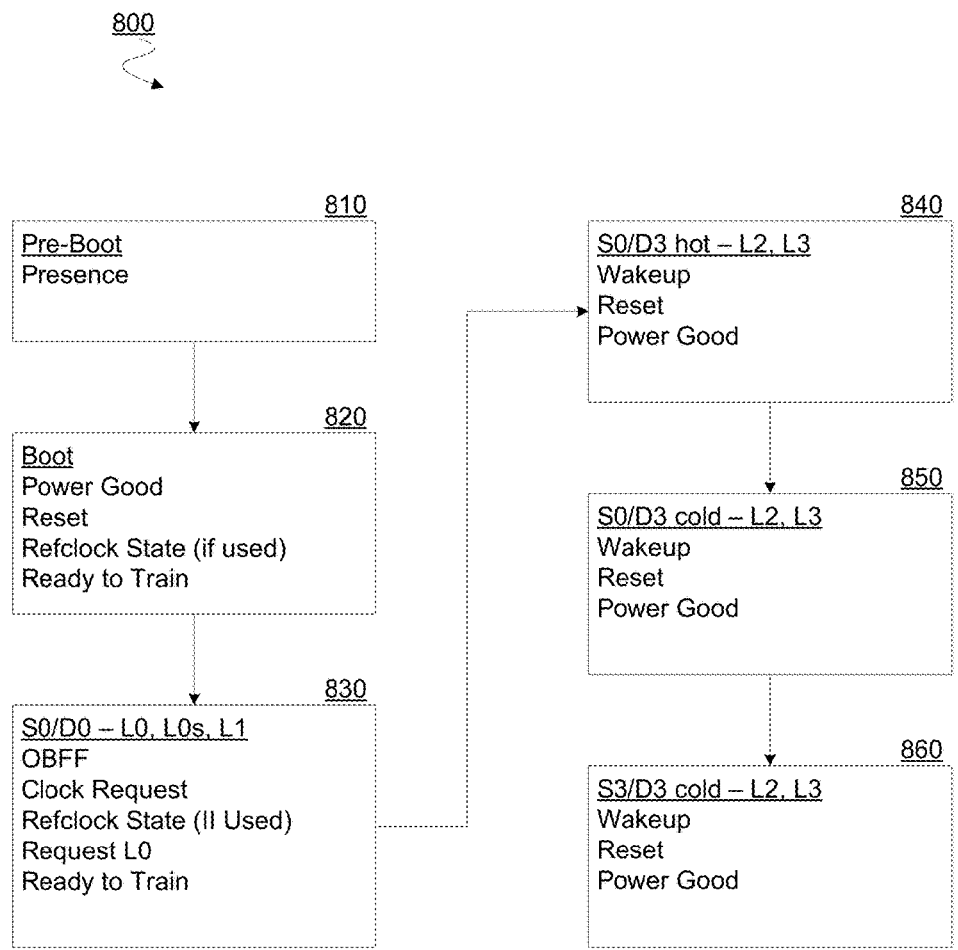
FIG. 8 is a state diagram illustrating elements of a data link layer according to an embodiment.

Referring now to FIG. 8, shown is a flow diagram for the various states of a sideband mechanism in accordance with an embodiment of the present invention. As shown in FIG. 8, these various states may be with regard to the root complex (e.g., host-controlled operation). State diagram 800 may provide for control of the various states via the host. As seen, operation begins in a pre-boot state 810 in which a presence signal may be communicated. Note that this presence signal may be as described above with regard to link management operations. Then control passes to a boot state 820 in which various signals may be communicated, namely a power good signal, a reset signal, a reference clock state signal and a ready to train signal. Note that all of these signals may be communicated via a single packet in which each of these signals may correspond to an indicator or field of the packet (e.g., a one bit indicator of the packet).

Still referring to FIG. 8, control passes next to an active state 830 in which a system may be in an active state (e.g., S0), a corresponding device (e.g., the downstream device may be an active device state (e.g., D0) and link may be in an active state, stall, or low power state (e.g., L0, L0s, or L1). As seen, in this state various signals may be communicated, including an OBFF signal, a clock request signal, a reference clock state, a request L0 signal and a ready to train signal.

Next, control may pass to a low power state 840, e.g., after the above signaling has been performed. As seen, in this low power state 840, the system may be in an active state while the device may be in a relatively low latency low power state (e.g., D3 hot). In addition, the link may be in a given low power state (e.g., L2 or L3). As seen in these states, the signals communicated via the consolidated sideband packet may include a wakeup signal, a reset signal, and a power good signal.

As the system goes into deeper low power states, a second low power state 850 may be entered (e.g., when the system is in an S0 state and the device is in a D3 cold state, and the link is similarly in an L2 or L3 state. As seen, the same wakeup, reset and power good signals may be communicated. Also seen in FIG. 8, the same signals may occur in a deeper power state 860 (e.g., a system low power state, S3) and a device low power state (e.g., D3 cold), and the same link low power states L2 and L3. Although shown with this particular set of sideband information communicated, understand the scope of the present invention is not limited in this regard.

Embodiments thus provide a layered structure with extensibility that may balance simplicity and low latency versus flexibility. In this way, existing sideband signals and additional sideband signals may be replaced with a smaller number of signals, and enable future expansion of sideband mechanisms without addition of more pins.

Figure 9:
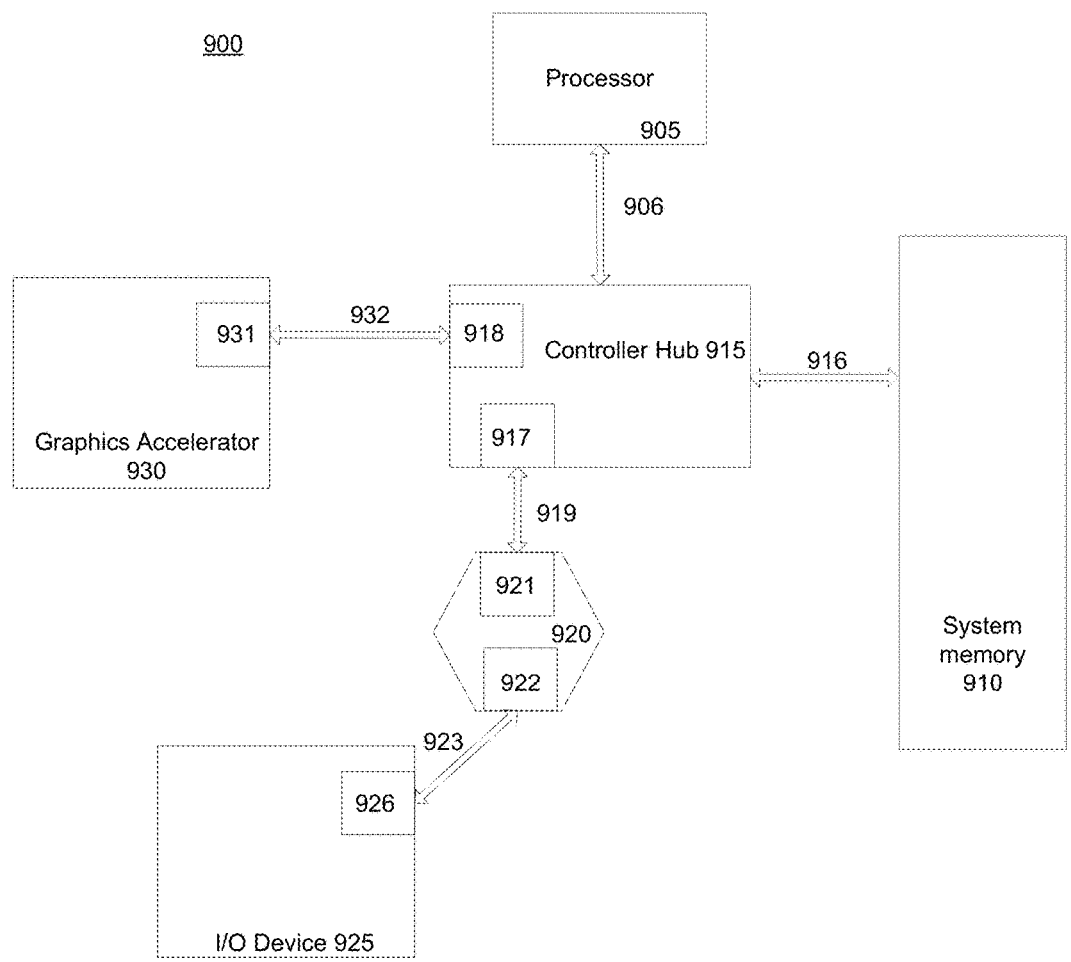
FIG. 9 is a block diagram illustrating elements of a computer system according to one embodiment.

Referring to FIG. 9, an embodiment of a fabric composed of point-to-point links that interconnect a set of components is illustrated. System 900 may include processor 905 and system memory 910 coupled to controller hub 915. Processor 905 may include any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect compatible with a PCIe specification. In another embodiment, link 906 may include a serial, differential interconnect architecture that is compliant with a different interconnect standard.

System memory 910 may include any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a PCIe interconnection hierarchy. Examples of controller hub 915 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described herein. In some embodiments, peer-to-peer routing is optionally supported through root complex 915.

Here, controller hub 915 is coupled to switch/bridge 920 through serial link 919. Switch/bridge 920 may include some or all of the features of device 110, for example. Input/output modules 917 and 921, which may also be referred to as interfaces/ports 917 and 921 may include/implement respective layered protocol stacks to provide communication between controller hub 915 and switch 920. In one embodiment, multiple devices are capable of being coupled to switch 920.

Switch/bridge 920 may variously process data packets sent from device 925 upstream via respective I/O modules 922, 926 and link 923, i.e. up a hierarchy towards a root complex, to controller hub 915 and/or downstream, i.e. down a hierarchy away from a root controller, from processor 905 or system memory 910 to device 925. In an embodiment, communications via link 923 and communications via link 919 are according to different respective communication protocols—e.g. where one is a PCIe communication protocol and the other is a different, lower-power communication protocol.

Switch 920, in one embodiment, may be considered a logical assembly of multiple virtual PCI-to-PCI bridge devices. Device 925 may include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. Similar to the MCH discussion above, a graphics controller or the graphics accelerator 930 itself may be integrated in processor 905.

In one implementation, a device comprises a first protocol stack and a second protocol stack each for a Peripheral Component Interconnect Express™ (PCIe™) communication protocol, the first protocol stack to exchange data packets with the second protocol stack. The device further comprises a first physical (PHY) unit to interface with the first protocol stack and to receive a first data packet sent to the device via a first physical link, and a second PHY unit to interface with the second protocol stack and to transmit a second data packet based on the first data packet from the device via a second physical link. The first PHY unit is to receive the first data packet according one of the PCIe™ communication protocol and a low power communication protocol according to a Mobile Industry Processor Interface (MIPI) specification, and the second PHY unit is to transmit the second data packet according the other of the PCIe™ communication protocol and the low power communication protocol.

In an embodiment, the low power communication protocol is according to a Mobile Industry Processor Interface (MIPI) specification. In another embodiment, the device is to operate as a bridge or a switch between components of a computer platform. In another embodiment, the device is to couple between computer platforms, and the device is to operate as a bridge or a switch for communication between the computer platforms.

In another embodiment, the first PHY unit includes a first physical unit circuit according to the low power communication protocol, and a first logical layer to interface the first protocol stack to the first physical unit circuit. In another embodiment, the first PHY unit further comprises sideband PHY circuitry to exchange sideband communications via a secondary interconnect. In another embodiment, the device further comprises a sideband manager to manage the sideband channel. In another embodiment, the sideband manager is to aggregate a plurality of sideband signals into a packet for communication on the sideband link. In another embodiment, the device further comprises a mapper to map first symbols of the PCIe™ communication protocol to second symbols of the low power communication protocol.

In another implementation, a method at a device comprises receiving, at a first physical (PHY) unit interfaced with a first protocol stack, a first data packet sent to the device via a first physical link, wherein the first PHY unit receives the first data packet according one of a Peripheral Component Interconnect Express™ (PCIe™) communication protocol and a low power communication protocol. The method further comprises exchanging data packets between the first protocol stack and a second protocol stack, the first protocol stack and the second protocol stack each for the PCIe™ communication protocol, and transmitting a second data packet from the device via a second physical link, the second data packet based on the first data packet, wherein a second PHY unit interfaced with the second protocol stack transmits the second data packet according the other of the PCIe™ communication protocol and the low power communication protocol.

In an embodiment, the low power communication protocol is according to a Mobile Industry Processor Interface (MIPI) specification. In another embodiment, the device operates as a bridge or a switch between components of a computer platform. In another embodiment, the device is coupled between computer platforms, wherein the device operates as a bridge or a switch for communication between the computer platforms.

In another embodiment, method further comprises, with a first logical layer of the first PHY unit, interfacing the first protocol stack to a first physical unit circuit of the first PHY unit, wherein the first physical unit circuit is for communication according to the low power communication protocol. In another embodiment, the method further comprises, with sideband PHY circuitry of the first PHY unit, operating a sideband channel for communications via a secondary interconnect. In another embodiment, the method further comprises managing the sideband channel with a sideband manager of the first PHY unit. In another embodiment, the sideband manager is to aggregate a plurality of sideband signals into a packet for communication on the sideband channel. In another embodiment, the method further comprises a mapper to map first symbols of the PCIe™ communication protocol to second symbols of the low power communication protocol.

In another implementation, a system comprises a first device including a first protocol stack and a second protocol stack each for a Peripheral Component Interconnect Express™ (PCIe™) communication protocol, the first protocol stack to exchange data packets with the second protocol stack. The first device further includes a first physical (PHY) unit to interface with the first protocol stack and to receive a first data packet sent to the device via a first physical link, and a second PHY unit to interface with the second protocol stack and to transmit a second data packet based on the first data packet from the device via a second physical link. The first PHY unit is to receive the first data packet according one of the PCIe™ communication protocol and a low power communication protocol according to a Mobile Industry Processor Interface (MIPI) specification, and the second PHY unit is to transmit the second data packet according the other of the PCIe™ communication protocol and the low power communication protocol. The system further comprises a first interconnect a second device coupled to the first device via the first PHY unit and the first interconnect.

In an embodiment, the low power communication protocol is according to a Mobile Industry Processor Interface (MIPI) specification. In another embodiment, the first device is to operate as a bridge or a switch between components of a computer platform. In another embodiment, the first device is to couple between computer platforms, and the device is to operate as a bridge or a switch for communication between the computer platforms.

In another embodiment, the first PHY unit includes a first physical unit circuit according to the low power communication protocol, and a first logical layer to interface the first protocol stack to the first physical unit circuit. In another embodiment, the first PHY unit further comprises sideband PHY circuitry to exchange sideband communications via a secondary interconnect. In another embodiment, the first device further comprises a sideband manager to manage the sideband channel. In another embodiment, the sideband manager is to aggregate a plurality of sideband signals into a packet for communication on the sideband link. In another embodiment, the first device further comprises a mapper to map first symbols of the PCIe™ communication protocol to second symbols of the low power communication protocol.

Techniques and architectures for processing data packets are described herein. In the above description, for purposes of explanation, numerous specific details are set forth in order to provide a thorough understanding of certain embodiments. It will be apparent, however, to one skilled in the art that certain embodiments may be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
a semiconductor chip comprising:
a PCIe physical layer interface;
a MIPI physical layer interface;
first PCIe protocol stack logic circuitry comprising first PCIe data link layer logic circuitry and first PCIe transactional layer logic circuitry, the first PCIe protocol stack logic circuitry coupled to the PCIe physical layer interface to process PCIe packets sent to/from the PCIe physical layer interface;
second PCIe protocol stack logic circuitry comprising second PCIe data link layer logic circuitry and second PCIe transactional layer logic circuitry, the second PCIe protocol stack logic circuitry coupled to the MIPI physical layer interface to process MIPI packets sent to/from the MIPI physical layer interface;
packet exchange logic circuitry coupled between the first PCIe protocol stack logic circuitry and the second PCIe protocol stack logic circuitry to enable transportation of packets between the PCIe physical layer interface and the MIPI physical layer interface in hardware.

2. The apparatus of claim 1 wherein the first PCIe protocol stack logic circuitry includes a link training and management layer logic circuitry.

3. The apparatus of claim 2, wherein the link training and management layer logic circuitry comprises link training status and state machine (LTSSM) logic circuitry, wherein, in response to encountering an error in the LTSSM, transmitter circuitry and receiver circuitry of the PCIe interface is to transition to a first known state of the LTSSM and transition to a second known state after the transition to the first known state.

4. The apparatus of claim 3, wherein the first known state is a STALL state.

5. The apparatus of claim 4, wherein the second known state is HIBERN8.

6. A computing system, comprising:
a processor;
a memory control hub;
memory coupled to the memory control hub;
a PCIe physical layer interface;
a MIPI physical layer interface;
first PCIe protocol stack logic circuitry comprising first PCIe data link layer logic circuitry and first PCIe transactional layer logic circuitry, the first PCIe protocol stack logic circuitry coupled to the PCIe physical layer interface to process PCIe packets sent to/from the PCIe physical layer interface;
second PCIe protocol stack logic circuitry comprising second PCIe data link layer logic circuitry and second PCIe transactional layer logic circuitry, the second PCIe protocol stack logic circuitry coupled to the MIPI physical layer interface to process MIPI packets sent to/from the MIPI physical layer interface;
packet exchange logic circuitry coupled between the first PCIe protocol stack logic circuitry and the second PCIe protocol stack logic circuitry to enable transportation of packets between the PCIe physical layer interface and the MIPI physical layer interface in hardware.

7. The computing system of claim 6 wherein the first PCIe protocol stack logic circuitry includes a link training and management layer logic circuitry.

8. The computing system of claim 7, wherein the link training and management layer logic circuitry comprises link training status and state machine (LTSSM) logic circuitry, wherein, in response to encountering an error in the LTSSM, transmitter circuitry and receiver circuitry of the PCIe interface is to transition to a first known state of the LTSSM and transition to a second known state after the transition to the first known state.

9. The computing system of claim 8, wherein the first known state is a STALL state.

10. The computing system of claim 9, wherein the second known state is HIBERN8.

* * * * *